United States Patent [19]

Halasa et al.

[11] Patent Number: 4,935,471
[45] Date of Patent: Jun. 19, 1990

[54] CAPPED POLYDIENES

[75] Inventors: Adel F. Halasa, Bath; Barry A. Matrana; Sylvia E. Robertson-Wilcox, both of Akron, all of Ohio

[73] Assignee: The Goodyear Tire & Rubber Company, Akron, Ohio

[21] Appl. No.: 108,846

[22] Filed: Oct. 15, 1987

[51] Int. Cl.$^5$ ................................................ C08F 8/30
[52] U.S. Cl. ........................... 525/359.1; 525/332.8; 525/332.4; 525/333.1; 525/333.2; 525/279; 525/280; 525/386
[58] Field of Search ...................... 525/280, 279, 359.1, 525/386

[56] References Cited

U.S. PATENT DOCUMENTS

| | | | |
|---|---|---|---|
| 3,135,716 | 6/1964 | Uraneck et al. | 525/385 |
| 3,144,429 | 8/1964 | Strobel | 525/280 |
| 3,177,190 | 4/1965 | Hsieh | 260/94.2 |
| 3,178,398 | 4/1965 | Strobel et al. | 525/359.3 |
| 3,402,162 | 9/1968 | Strobel | 260/94.2 |
| 3,576,908 | 4/1971 | Brack | 525/359.3 |
| 3,590,008 | 6/1971 | Hausley | 525/280 |
| 3,766,301 | 10/1973 | De La Mare et al. | 525/386 |
| 3,860,566 | 1/1975 | Zelinski et al. | 525/359.3 |
| 4,077,893 | 3/1978 | Kiovsky | 252/56 R |
| 4,117,036 | 9/1978 | Honda et al. | 525/359.3 |
| 4,677,153 | 6/1987 | Kitahara et al. | 525/359.3 |

*Primary Examiner*—Bernard Lipman
*Attorney, Agent, or Firm*—Alvin T. Rockhill

[57] ABSTRACT

Polydiene rubbers are commonly compounded with carbon black in making a wide variety of rubber articles including tires, hoses and belts. It is generally desirable for the carbon black to be well dispersed throughout the polydiene in order to attain optimal physical properties. For instance, the traction and rolling resistance of tires which are made utilizing such rubbers can be improved by better dispersing the carbon black throughout the polydiene. The subject invention discloses a technique for capping polydienes in order to improve their affinity for carbon black. The present invention more specifially reveals a process for preparing a polydiene having a high level of affinity for carbon black which comprises reacting a metal terminated polydiene with a capping agent selected from the group consisting of (a) halogenated nitriles having the structural formula $X-A-C \equiv N$ where X represents a halogen atom and wherein A represents an alkylene group containing from 1 to 20 carbon atoms, (b) heterocyclic aromatic nitrogen containing compounds, and (c) alkyl benzoates. Both ends of polydiene chains can be capped with polar groups by utilizing functionalized initiators, such as lithium amides.

4 Claims, No Drawings

CAPPED POLYDIENES

BACKGROUND OF THE INVENTION

Metals from Groups I and II of the periodic table are commonly used to initiate the polymerization of monomers into polymers. For example, lithium, barium, magnesium, sodium, and potassium are metals that are frequently utilized in such polymerizations. Initiator systems of this type are of commercial importance because they can be used to produce stereo regulated polymers. For instance, lithium initiators can be utilized to initiate the anionic polymerization of isoprene into cis-1,4-polyisoprene or to initiate the polymerization of 1,3-butadiene into high vinyl polybutadiene.

The polymers formed in such polymerizations are terminated with the metal used to initiate the polymerization and are sometimes referred to as living polymers. They are referred to as living polymers because the polymer chains which are terminated with the metal initiator continue to grow or live until all of the available monomer is exhausted. Polymers that are prepared by utilizing such metal initiators normally have structures which are essentially linear and normally do not contain appreciable amounts of branching.

Such polymers are normally compounded with sulfur, carbon black, accelerators, antidegradants and other desired rubber chemicals and are then subsequently vulcanized or cured into the form of a useful article. It has been established that the physical properties of such cured rubbers depend upon the degree to which the carbon black is homogeneously dispersed throughout the polydiene rubber. This is in turn related to the level of affinity that carbon black has for the particular polydiene. This can be of practical importance in improving the physical characteristics of rubber articles which are made utilizing polydienes. For example, the rolling resistance and traction characteristics of tires can be improved by improving the affinity of carbon black to the polydiene rubbers utilized therein. Therefore, it would be highly desirable to improve the affinity of a given polydiene rubber for carbon black. This is because a better dispersion of carbon black throughout polydiene rubbers which are utilized in compounding tire tread compositions results in a lower hysteresis value and consequently tires made therefrom have lower rolling resistance. Low tan delta values at 60° C. are indicative of low hysteresis and consequently tires made utilizing such polydienes with low tan delta values at 60° C. have lower rolling resistance. Better dispersions of carbon black throughout the polydiene rubber also cause higher tan delta values at 0° C. which causes tires made therefrom to have better traction characteristics.

SUMMARY OF THE INVENTION

The present invention provides a means for capping diene rubbers in order to improve the affinity of carbon black to them. By utilizing the technique of the present invention, better dispersions of carbon black throughout polydienes can be prepared. The capped polydienes of this invention which have a high level of affinity for carbon black can be utilized in manufacturing tires which have a lower level of rolling resistance and better traction characteristics.

The present invention more specifically discloses a polydiene having a high level of affinity for carbon black which is comprised of polymer chains which are comprised of repeat units which are derived from at least one conjugated diolefin monomer wherein said polymer chains are terminated with a member selected from the group consisting of cyanide groups and heterocyclic aromatic nitrogen containing groups.

The subject invention also reveals a process for preparing a polydiene having a high level of affinity for carbon black which comprises reacting a metal terminated polydiene with a capping agent selected from the group consisting of (a) halogenated nitriles having the structural formula X—A—C≡N wherein X represents a halogen atom and wherein A represents an alkylene group containing from 1 to 20 carbon atoms, (b) heterocyclic aromatic nitrogen containing compounds, and (c) alkyl benzoates.

It is highly preferred to utilize a lithium amide in the synthesis of the metal terminated polymer. This is because their use results in an extra polar group being incorporated into the polydiene chains. Thus, both ends of polydiene chains can be capped with polar groups by utilizing such functionalized initiators in conjunction with the capping agents of this invention.

DETAILED DESCRIPTION OF THE INVENTION

The subject invention provides a means for capping polydienes which improves their affinity for carbon black. The process of the present invention can be used to cap any polymer which is terminated with a metal of group I or II of the periodic table. These polymers can be produced utilizing techniques that are well known to persons skilled in the art. The initiator used in initiating the polymerization utilized in producing such polymers is most commonly selected from the group consisting of barium, lithium, magnesium, sodium, and potassium. Lithium and magnesium are the metals that are most commonly utilized in the synthesis of such metal terminated polymers (living polymers). U.S. Pat. No. 4,048,420, which is incorporated herein by reference in its entirety, describes the synthesis of a lithium terminated polymer which is catalyzed with very finely divided lithium having an average particle diameter of less than 2 microns.

Organolithium compounds are the preferred initiators for utilization in such polymerizations. The organolithium compounds which are utilized as initiators are normally organo monolithium compounds. The organolithium compounds which are preferred as initiators are monofunctional compounds which can be represented by the formula: R-Li, wherein R represents a hydrocarbyl radical containing from 1 to about 20 carbon atoms. Generally, such monofunctional organolithium compounds will contain from 1 to about 10 carbon atoms. Some representative examples of preferred organolithium compounds include methyllithium, ethyllithium, isopropyllithium, n-butyllithium, secbutyllithium, n-hexyllithium, n-octyllithium, tertoctyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium. Secondary-butyllithium is a highly preferred organolithium initiator. Lithium amides are also highly preferred initiators because they can be used to prepare polydienes which are terminated with polar groups at both ends of their polymer chains. The extra polar functionality provided by lithium amides results in increased interaction with carbon black resulting in better polymer-carbon black dispersion. The lithium amides that can be used include lithium pyrrolidide. Amino alkyl lithium compounds having the following structural formula are also preferred initiators:

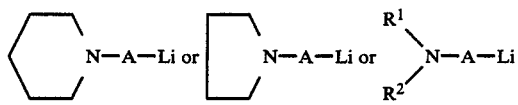

wherein A represents an alkylene group containing from 1 to 20 carbon atoms, and wherein $R^1$ and $R^2$ can be the same or different and represent alkyl groups containing from 1 to 20 carbon atoms.

The amount of organolithium initiator utilized will vary depending upon the molecular weight which is desired for the polymer being synthesized as well as the precise polymerization temperature which will be utilized. The precise amount of organolithium compound required to produce a polymer of a desired molecular weight can be easily ascertained by persons skilled in the art. However, as a general rule from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

The metal terminated polymers to which the present invention pertains which can be made utilizing organomonofunctional initiators have the general structural formula P-M, wherein P represents a polymer chain and wherein M represents a metal of group I or II. The metal terminated polymers utilized in the practice of this invention can be of virtually any molecular weight. However, the maximum benefits of this invention will be realized when polymers having number average molecular weights within the range of about 50,000 to about 500,000 are used. It is normally preferred for such polymers to have number average molecular weights within the range of 100,000 to 250,000. The metal initiators utilized in the synthesis of such metal terminated polymers can also be multifunctional organometallic compounds. For instance, difunctional organometallic compounds can be utilized to initiate such polymerizations. The utilization of such difunctional organometallic compounds as initiators generally results in the formation of polymers having the general structural formula M-P-M, wherein P represents a polymer chain and wherein M represents a metal of group I or II. Such polymers which are terminated at both of their chain ends with a metal from group I or II can be treated so as to affix capping agents to both of their chain ends. The benefits attained by utilizing difunctional initiators and capping both of the chain ends can further improve interaction with carbon black.

Many types of unsaturated monomers which contain carbon-carbon double bonds can be polymerized into polymers using such metal catalysts. Elastomeric or rubbery polymers can be synthesized by polymerizing diene monomers utilizing this type of metal initiator system. The diene monomers that can be polymerized into synthetic rubbery polymers can be either conjugated or nonconjugated diolefins. Conjugated diolefin monomers containing from 4 to 8 carbon atoms are generally preferred. Vinyl-substituted aromatic monomers can also be copolymerized with one or more diene monomers into rubbery polymers, for example styrenebutadiene rubber (SBR). Some representative examples of conjugated diene monomers that can be polymerized into rubbery polymers include 1,3-butadiene, isoprene, 1,3-pentadiene, 2,3-dimethyl-1,3-butadiene, 2-methyl1,3-pentadiene, 2,3-dimethyl-1,3-pentadiene, 2-phenyl-1,3-butadiene, and 4,5-diethyl-1,3-octadiene. Some representative examples of vinyl-substituted aromatic monomers that can be utilized in the synthesis of rubbery polymers include styrene, 1-vinylnapthalene, 3-methylstyrene, 3,5-diethylstyrene, 4-propylstyrene, 2,4,6-trimethylstyrene, 4-dodecylstyrene, 3-methyl-5-normal-hexylstyrene, 4-phenylstyrene, 2-ethyl-4-benzylstyrene, 3,5-diphenylstyrene, 2,3,4,5-tetraethylstyrene, 3-ethyl-1-vinylnapthalene, 6-isopropyl-1-vinylnapthalene, 6-cyclohexyl-1-vinylnapthalene, 7-dodecyl-2-vinylnapthalene, α-methylstyrene, and the like.

Metal terminated polymers are generally prepared in solution polymerizations which utilize inert organic solvents, such as saturated aliphatic hydrocarbons, aromatic hydrocarbons, or ethers. The solvents used in such solution polymerizations will normally contain from about 4 to about 10 carbon atoms per molecule and will be liquids under the conditions of the polymerization. Some representative examples of suitable organic solvents include pentane, isooctane, cyclohexane, normal-hexane, benzene, toluene, xylene, ethylbenzene, tetrahydrofuran, and the like, alone or in admixture. Such solution polymerizations result in the formation of a polymer cement (a highly viscous solution of the polymer).

The metal terminated polymers in such polymer solutions can be capped with nitrile groups, heterocyclic aromatic nitrogen containing groups or benzoate derived groups by simply adding a stoichiometric amount of one of the capping agents of this invention to the solution. In other words, approximately one mole of capping agent is added per mole of terminal metal groups in the living polymer. The number of moles of metal end groups in such polymers is assumed to be the number of moles of the metal utilized in the initiator. It is, of course, possible to add greater amounts of the capping agent being used. However, the utilization of greater amounts is not beneficial to final polymer properties. Nevertheless, in many cases it will be desirable to utilize a slight excess of the capping agent in order to insure that at least a stoichiometric amount is actually employed or to control the stoichiometry of the capping reaction. In most cases from about 0.8 to about 1.1 moles of the capping agent will be utilized per mole of metal end groups in the living polymer being treated. In the event that it is not desired to cap all of the metal terminated chain ends in a polymer then, of course, lesser amounts of the capping agent can be utilized.

The capping agents of this invention will react with metal terminated living polymers over a very wide temperature range. For practical reasons the capping of such living polymers will normally be carried out at a temperature within the range of 0° C. to 150° C. In order to increase reaction rates, in most cases it will be preferred to utilize a temperature within the range of 30° C. to 100° C. with temperatures within the range of 50° C. to 80° C. being most preferred. The capping reaction is very rapid and only very short reaction times within the range of 0.5 to 4 hours are normally required. However, in some cases reaction times of up to about 24 hours may be employed to insure maximum conversions.

The capping agents which are used in the practice of this invention include halogenated nitriles, heterocyclic aromatic nitrogen containing compounds and alkyl benzoates. The halogenated nitriles which can be used have the structural formula X—A—C≡N wherein X represents a halogen atom and wherein A represents an alkylene group containing from 1 to 20 carbon atoms. Fluorine, bromine and chlorine are preferred halogens with chlorine being the most preferred. In most cases A will represent an alkylene group containing from 1 to 20 carbon atoms, with alkylene groups containing from 1 to 4 carbon atoms, such as methylene, ethylene, propylene, and butylene groups, being most preferred.

The heterocyclic aromatic nitrogen containing compounds that can be used will normally contain from 4 to 14 carbon atoms and can additionally contain sulfur and/or oxygen atoms. Some representative examples of heterocyclic aromatic nitrogen containing compounds that can be used include pyrrole, imidazole, pyrazole, pyridine, pyrazine, pyrimidine, pyridazine, indolizine, isoindole, 3H-indole, cinnoline, pteridine, β-carboline, perimidine, and phenanthroline. Pyridine is a highly preferred heterocyclic aromatic nitrogen containing compounds.

The alkyl benzoates that can be used will normally contain from 8 to 28 carbon atoms. Such alkyl benzoates have the structural formula:

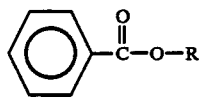

wherein R represents an alkyl group containing from 1 to 20 carbon atoms. In most cases, R will represent an alkyl group containing from 1 to 10 carbon atoms with alkyl groups which contain from 1 to 6 carbon atoms being preferred. Ethylbenzoate is an example of a highly preferred alkyl benzoate.

The capping agents of this invention react with metal terminated polydienes and replace the metal with a terminal cyanide group, a heterocyclic aromatic nitrogen containing group or a terminal group which is derived from an alkyl benzoate. For example, if the metal terminated polydiene is capped with a nitrile, it will result in the polydiene chains being terminated with cyanide groups. The use of heterocyclic aromatic nitrogen containing compounds as capping agents can result in the polydiene chains being terminated with a pyrrolyl group, an imidazolyl group, a pyrazolyl group, a pyridyl group, a pyrazinyl group, a pyrimidinyl group, a pyridazinyl group, an indolizinyl group, an isoindolyl group, a 3-H-indolyl group, a cinnolinyl group, a pteridinyl group, a β-carbolinyl group, a perimidinyl group, a phenanthrolinyl group or the like.

For example, pyridine can be utilized to cap lithium terminated polydienes as follows:

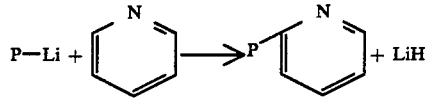

Phenanthroline is a particularly good capping agent because it can be used to cap two metal terminated polydienes. In such cases about 0.5 moles of phenanthroline is utilized per mole of metal end groups in the living polymer. For example, 1,7-phenanthroline can cap two lithium terminated polydienes as follows:

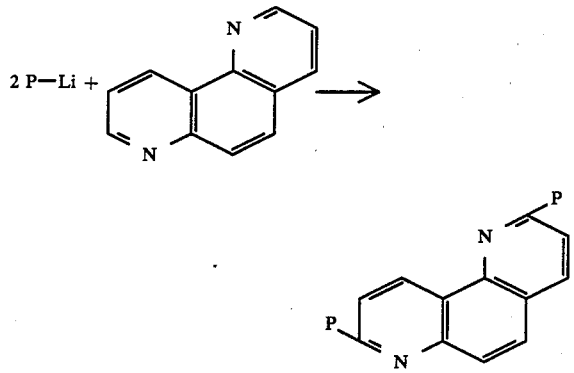

The utilization of phenanthroline as a capping agent is also advantageous because it is highly polar. In some cases, it may be desirable to utilize greater than a stoichiometric amount of phenanthroline to cap metal terminated chains. This will limit the number of phenanthroline molecules that cap to metal terminated polymers and cause greater amounts of phenanthroline molecular to cap only one metal terminated polymer. By utilizing phenanthroline as a monofunctional capping agent, the total polar character of the metal terminated polydiene being capped can be increased.

If the metal terminated polydiene is capped with an alkyl benzoate, it will have a terminal group which is derived from the alkyl benzoate. However, alkyl benzoates can act as bifunctional capping agents which results in the polar group being incorporated into the middle of two polydiene chains. For example, methylbenzoate can be utilized to cap a first lithium terminated polydiene as follows:

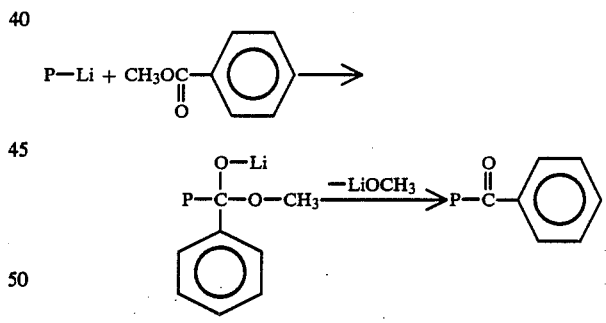

and the capped polydiene produced can react with a second lithium terminated polydiene as follows:

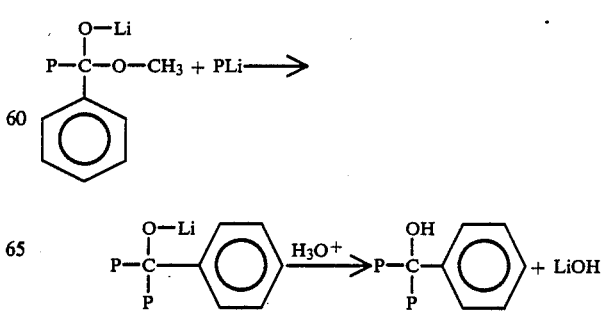

After the capping reaction is completed, it will normally be desirable to "kill" any living polydiene chains which remain. This will prevent the living polymer from reacting with any carbon dioxide that may be present. For this reason it is normally desirable to add an alcohol, such as methanol or ethanol, to the polymer cement after the capping reaction is completed in order to eliminate any living polymer that was not consumed by the capping reaction. The capped polydiene rubber can then be recovered utilizing standard techniques. The capped polydiene can then be compounded and cured utilizing conventional procedures and standard vulcanization temperatures. For example, polydiene rubbers which have been capped in accordance with this invention will normally be cured at a temperature within the range of about 120° C. to about 220° C. In most cases it will be preferred for the curing to be done at a temperature within the range of about 135° C. to about 165° C.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

The first step in this experiment was the synthesis of a living polybutadiene which was terminated with lithium. A 5 gallon (18.9 liter) reactor was utilized in this experiment. It was conditioned for the polymerization by the addition of a 1.6 molar normal-butyl lithium in hexane solution which was stirred in the reactor at a temperature of about 150° F. (66° C.) for about 1 hour. The reactor was then cooled and the normal-butyl lithium solution was dumped. The reactor was then charged with a premixed solution of 1,3-butadiene in hexane which contained 18% butadiene. The premixed solution was previously passed through silica gel and alumina ($Al_2O_3$). The premixed solution was stirred while bubbling nitrogen through it in order to ensure that no oxygen was present.

Tetramethylethylene diamine was added as a modifier in order to produce a polymer having a high vinyl content. The polymerization was initiated by the introduction of normal-butyl lithium. Nitrogen was added in order to maintain a pressure of 40 lbs. which inhibited the entry of air, water, or other undesirable contaminants. The polymerization was allowed to proceed at a temperature of 125° F. (52° C.) until a conversion of essentially 100% was reached. The polymerization took approximately 3 hours.

After the polymerization was completed, one-half of the polymer cement produced was drawn under isopropanol as a control. The isopropanol killed living lithium-terminated polymer chains which prevented undesirable side reactions from taking place, such as reactions with carbon dioxide in the air. The polymer cement remaining in the reactor was then capped with chloroacetonitrile via a bomb containing the chloroacetonitrile as a dilute solution. The molar ratio of chloroacetonitrile to lithium in the polymer produced was 10:1. The polymer cement was heated at 150° F. (66° C.) with stirring for at least 1 hour after the chloroacetonitrile was introduced into the reactor. The reactor was then cooled to room temperature with stirring being maintained overnight in order to induce complete capping. An antioxidant and a small amount of methanol was then added. The polymer cement was stirred for 1 additional hour and subsequently recovered and dried in an oven. It was determined that the polymer produced had a tan delta at 60° C. of 0.074 and a tan delta at 0° C. of 0.425. This compares very favorably with the tan deltas that were measured for the control. In fact, the control had a tan delta at 60° C. of 0.126 and a tan delta at 0° C. of 0.330. Thus, the utilization of chloroacetonitrile as a capping agent both decreased tan delta at 60° C. and increased tan delta at 0° C. Accordingly, tires which are made utilizing such a capped polybutadiene can have both improved rolling resistance and improved traction characteristics.

As a general rule, it is highly desirable to have a tan delta at 60° C. of less than about 0.10. It is normally more desirable to have a tan delta at 60° C. of less than about 0.090 with tan deltas at 60° C. of less than 0.08 being highly preferred.

EXAMPLE 2

The procedure utilized in Example 1 was repeated in this experiment except that ethylbenzoate was utilized as the capping agent at a molar ratio of ethylbenzoate to lithium end groups of 5:1. The capped polymer produced in this experiment had a tan delta at 60° C. of 0.091 and a tan delta at 0° C. of 0.316. These tan delta values compare very favorably with those that were determined for the control which were 0.110 at 60° C. and 0.276 at 0° C. It was additionally determined by GPC that the polymer produced had a number average molecular weight of about 208,000.

EXAMPLE 3

This experiment was carried out utilizing the same procedure as was specified in Example 1 except that pyridine was utilized as the capping agent at a molar ratio of pyridine to lithium of 100:1. The capped polybutadiene produced was determined to have a tan delta at 60° C. of 0.119 and a tan delta at 0° C. of 0.261. The polymer produced was additionally determined to have a number average molecular weight of 139,000.

EXAMPLE 4

In this experiment the procedure described in Example 1 was utilized to prepare a capped polybutadiene except that methylbenzoate was utilized in place of chloroacetonitrile as the capping agent. The capped polymer produced was determined to have a tan delta at 60° C. of 0.084 and a tan delta at 0° C. of 0.105.

EXAMPLE 5

In this experiment a polydiene which was capped at both ends of its polymer chains was prepared. In the first step, 500 cc of a 1,3-butadiene in hexane premix containing 15% butadiene was added to a clean, dry nitrogen flushed quart bottle. The polymerization was initiated by adding 22 mmoles of lithium pyrrolidide and the bottle was sealed with a teflon lined cap. The polymerization was allowed to proceed at 63° C. for about 2 hours. Then 22 mmoles of chloroacetonitrile was added to the polymer cement and shaken to provide good mixing. Subsequently, the polymer cement was poured into 1000 cc of methanol and stirred to coagulate the polymer and remove excess capping agent. The coagulated polymer was transferred to a beaker and hexane was added to the 550 cc level. The mixture was stirred to dissolve the polymer and 2.25 mmoles of an antioxidant was added. The capped polymer was recovered by air drying and had a high level of affinity for carbon black.

EXAMPLE 6

In this experiment an SBR which was capped at both ends of its polymer chains was prepared. The polymer was prepared according to the procedures outlined in Example 1. A styrene/butadiene in hexane premix (12,512 g) containing 3.5% styrene and 14.7% 1,3-butadiene was added to the five gallon reactor. Tetramethylethylene diamine (TMEDA) was added to the reactor to give a molar ratio of TMEDA/Li=2. The reactor was heated to 125° F. (52° C.) and 2.0 m lithium pyrrolidide was added to the reactor in sufficient quantity to prepare a nominal number average molecular weight of 160,000. The polymerization was allowed to proceed at 125° F. (52° C.) until no further change in conversion was obtained (essentially 100% conversion). The polymerization took approximately two hours.

At the end of the polymerization, approximately one third of the polymer cement (3,281 g) was sampled into six quart (946 ml) bottles under flowing nitrogen to inhibit reaction with air or $CO_2$. Each of the quart bottles (946 ml) contained 1 cc of ethyl alcohol which had been purged with nitrogen. The bottles were capped and then shaken to "kill" the living polymer by reaction with the ethyl alcohol. An antioxidant/antiozonant (1 part/100 polymer) was added to the cements and then the polymer was poured out into open trays to dry.

To the remaining polymer in the reactor, a 4,4'-bis(dimethylamino)benzophenone solution (375 cc, 0.021 m in toluene) was added to five a 2 molar percent excess of the ketone (based on "live" lithium). The reactor was cooled to room temperature and the polymer cement was stirred overnight. The reactor temperature was increased to 155° F. (68° C.) on the following day and the solution was stirred at this temperature for 6 hours. Ethyl alcohol (2 cc) was added to the reactor to terminate any remaining living polymer. After lowering the reactor temperature to room temperature, the polymer cement was drained from the reactor and antioxidant/antiozonant (1 part/100 polymer) was stirred into the cement. The cement was dried in open trays at 125° F. (52° C.).

After compounding, the bi-capped SBR had a tan delta at 60° C. of 0.100 and a tan delta at 0° C. of 0.390 compared to values of 0.114 and 0.39, respectively for the SBR which was not treated with 4,4'-bis(dimethylamino)benzophenone. Furthermore, an uncapped but similar SBR prepared with n-butyl lithium as the initiator and which was not treated with 4,4'bis(dimethylamino)benzophenone had a tan delta at 60° C. of 0.140 and a tan delta at 0° C. of 0.324.

While certain representative embodiments and details have been shown for the purpose of illustrating the present invention, it will be apparent to those skilled in this art that various changes and modifications can be made therein without departing from the scope of the present invention.

What is claimed is:

1. A process for preparing a polydiene having a high level of affinity for carbon black which comprises reacting a metal terminated polydiene with a halogenated nitrile having the structural formula X—A—C≡N wherein X represents a halogen atom and wherein A represents an alkylene group containing from 1 to 20 carbon atoms; wherein said reaction is carried out at a temperature which is within the range of 0° C. to 150° C.; wherein said polydiene is comprised of repeat units which are derived from at least one conjugated diolefin monomer containing from 4 to 8 carbon atoms; wherein said polydiene has a number average molecular weight which is within the range of 50,000 to 500,000; and wherein said polydiene is terminated with lithium.

2. A process as specified in claim 1 wherein the metal terminated polydiene rubber is polybutadiene.

3. A process as specified in claim 1 wherein said halogenated nitrile has the structural formula X—A—C≡N wherein X represents a halogen atom selected from the group consisting of fluorine, bromine and chlorine and wherein A represents an alkylene group containing from 1 to 4 carbon atoms.

4. A process as specified in claim 3 wherein said halogenated nitrile is chloroacetonitrile.

* * * * *